(12) United States Patent
Guo

(10) Patent No.: US 7,484,589 B2
(45) Date of Patent: Feb. 3, 2009

(54) APPARATUS AND METHOD FOR REDUCING AIRCRAFT NOISE AND ACOUSTIC FATIGUE

(75) Inventor: Yueping Guo, Seal Beach, CA (US)

(73) Assignee: The Boeing Company, Chicago, IL (US)

( * ) Notice: Subject to any disclaimer, the term of this patent is extended or adjusted under 35 U.S.C. 154(b) by 434 days.

(21) Appl. No.: 10/792,941

(22) Filed: Mar. 4, 2004

(65) Prior Publication Data

US 2005/0194205 A1    Sep. 8, 2005

(51) Int. Cl.
  *B64F 1/26* (2006.01)
(52) U.S. Cl. .................. 181/210; 181/175; 181/292; 181/290; 181/207; 181/208; 244/1 N; 244/114 B; 244/198; 244/199.1; 244/200
(58) Field of Classification Search .................. 181/210, 181/175, 292, 290, 207, 208, 222, 293, 294; 244/114 B, 1 N, 198, 199.1, 200, 200.1, 99.12, 244/99.13, 174, 110 E, 114 R, 110 A, 110 B, 244/110 C, 110 D, 110 F, 110 G, 110 H, 244/116; 114/261
See application file for complete search history.

(56) References Cited

U.S. PATENT DOCUMENTS

| | | | | |
|---|---|---|---|---|
| 1,625,020 A | * | 4/1927 | Diago | 244/63 |
| 1,813,986 A | * | 7/1931 | Breeze | 244/114 R |
| 2,268,320 A | * | 12/1941 | Brandt | 244/114 R |
| 2,556,884 A | * | 6/1951 | Muller | 181/290 |
| 2,765,994 A | * | 10/1956 | Assen | 244/114 R |
| 2,912,952 A | * | 11/1959 | Simmons | 114/261 |
| 2,988,308 A | * | 6/1961 | Czerwinski | 244/114 B |
| 3,010,684 A | * | 11/1961 | Phillips et al. | 244/114 B |
| 3,035,657 A | * | 5/1962 | Lemon | 181/290 |
| 3,037,726 A | * | 6/1962 | Phillips | 244/114 B |
| 3,096,847 A | * | 7/1963 | Hardy | 181/210 |

(Continued)

FOREIGN PATENT DOCUMENTS

DE    4006962 A1 *   9/1991

(Continued)

OTHER PUBLICATIONS

Alexander F. Vakakis, "Designing a Linear Structure with a Local Nonlinear Attachment for Enhanced Energy Pumping" Meccanica, Dec. 2003; 38:677-686.

*Primary Examiner*—Walter Benson
*Assistant Examiner*—Forrest M Phillips
(74) *Attorney, Agent, or Firm*—Evan Law Group LLC

(57) ABSTRACT

An apparatus and method is provided for attenuating aerospace engine noise and unsteady pressure fluctuations associated with high velocity exhaust flows. The apparatus and method reduce acoustic fatigue damage to aerospace vehicles that may be caused by the reflection of exhaust energy from landing and/or launch platforms. The apparatus includes a passive treatment area associated with the platform operable for reducing the magnitude of the reflected sound waves and unsteady pressure fluctuations from the high velocity exhaust mass flow exiting from the engine. The passive treatment area may include a layer of sound absorptive material, at least one set of roughness elements for disrupting high velocity flow structures. A protective cover may be positioned over the passive treatment area for permitting exhaust flow to pass therethrough while still providing adequate structure to support the weight of the aerospace vehicle.

46 Claims, 5 Drawing Sheets

U.S. PATENT DOCUMENTS

| | | | | |
|---|---|---|---|---|
| 3,096,956 A * | 7/1963 | Oestrich | | 244/114 B |
| 3,857,459 A * | 12/1974 | Adams et al. | | 181/295 |
| 4,202,646 A * | 5/1980 | Herstad | | 404/36 |
| 4,420,131 A * | 12/1983 | Middleton | | 244/115 |
| 4,541,594 A * | 9/1985 | Foley | | 244/114 B |
| 4,836,472 A * | 6/1989 | Sutter et al. | | 244/114 R |
| 4,958,700 A * | 9/1990 | Schafhaupt | | 181/218 |
| 5,268,540 A * | 12/1993 | Rex | | 181/210 |
| 5,351,915 A * | 10/1994 | Aandalen | | 244/114 R |
| 5,400,296 A * | 3/1995 | Cushman et al. | | 367/1 |
| 5,451,448 A * | 9/1995 | Sawko et al. | | 428/175 |
| 5,577,687 A * | 11/1996 | Downing | | 244/110 E |
| 5,591,904 A * | 1/1997 | Schafhaupt et al. | | 73/117.4 |
| 5,607,742 A * | 3/1997 | Ing et al. | | 428/98 |
| 5,845,875 A * | 12/1998 | Deel | | 244/63 |
| 5,971,326 A * | 10/1999 | Bechert | | 244/200 |
| 6,016,996 A * | 1/2000 | Angel | | 244/114 B |
| 6,119,935 A * | 9/2000 | Jelen et al. | | 235/383 |
| 6,174,587 B1 * | 1/2001 | Figge, Sr. | | 428/178 |
| 6,200,664 B1 * | 3/2001 | Figge et al. | | 428/178 |
| 6,375,118 B1 * | 4/2002 | Kibens et al. | | 244/53 R |
| 6,520,449 B2 * | 2/2003 | Illingworth | | 244/12.1 |
| 6,685,387 B2 * | 2/2004 | Allen et al. | | 404/10 |
| 6,837,456 B1 * | 1/2005 | Shih et al. | | 244/12.1 |
| 6,868,940 B1 * | 3/2005 | Mekwinski | | 181/290 |
| 7,070,850 B2 * | 7/2006 | Dietz et al. | | 428/172 |
| 2002/0117351 A1 * | 8/2002 | Chen | | 181/292 |
| 2003/0098200 A1 * | 5/2003 | Clark | | 181/292 |
| 2004/0256519 A1 * | 12/2004 | Ellis et al. | | 244/110 E |

FOREIGN PATENT DOCUMENTS

| | | | | |
|---|---|---|---|---|
| FR | 2677326 A1 * | 12/1992 | | |
| JP | 01226906 | * | 9/1989 | 181/210 |

* cited by examiner

APPARATUS AND METHOD FOR REDUCING AIRCRAFT NOISE AND ACOUSTIC FATIGUE

FIELD OF THE INVENTION

The present invention relates to an apparatus and method for attenuating noise and unsteady pressure fluctuations associated with high velocity exhaust flows, and more particularly, for reducing acoustic fatigue on aerospace vehicles caused by exhaust flows impinging on a landing or launch platform.

BACKGROUND

Short Take Off and Vertical Landing (STOVL) aircraft and Vertical Take Off and Landing (VTOL) aircraft are known to generate intense noise and unsteady pressure fluctuations during landing and takeoff operations. The most severe environment is when such an aircraft is within about 10 feet of an aircraft carrier deck, the ground, or a launch/landing pad. The noise and pressure fluctuations at these operating conditions are usually about 10 dB higher than that of free flight. Pressure fluctuations can also be resonant with the aircraft structure, inducing acoustic fatigue.

To prevent structural failure due to acoustic fatigue, a STOVL aircraft must carry extra weight to reinforce its structure. Some analysts suggest that as much as 100 pounds of extra structural weight can be eliminated if the noise levels at landing and takeoff can be reduced by about 3 to 5 dB.

Clearly, the reduction of the noise/pressure fluctuations for STOVL operations is an important environmental issue, in addition to the impact on aircraft design and cost. Many techniques have been utilized in the past to reduce the impact of high velocity exhaust flow, but these techniques almost exclusively focus on the aircraft itself. This inevitably adds implementation cost and extra weight to the aircraft. There is a need to minimize the magnitude of the noise and unsteady pressure fluctuations of the exhaust flow rather than merely minimizing the destructive results thereof. The present invention is directed to solving one or more problems associated with the prior art.

SUMMARY

The present invention provides for an aircraft support platform having passive treatment areas positioned on the platform at some local positions. The passive treatment area is operable for reducing the magnitude of the sound waves and unsteady pressure fluctuations generated by high velocity exhaust mass flow exiting from an aircraft engine and impinging on a surface of the platform.

The passive treatment area may include at least one roughness element for disrupting high velocity coherent motions of the exhaust flow to attenuate the generated sound waves and the unsteady pressure fluctuations. The roughness elements may be embedded or fixed in the layer of sound absorptive material or alternatively, may be moveable with respect to the layer of sound absorptive material.

The roughness elements may be formed from any of a plurality of geometric shapes such as a sphere, a cylinder, a cube, a tetrahedron, or alternatively, may be formed in an irregular shape. In addition, roughness elements may be formed from any of a plurality of materials that can withstand the temperatures and pressures associated with aerospace engine exhaust flow. Any suitable materials may be used to form the roughness elements. For example, metal, composite, and/or ceramic materials may be used. The roughness elements can also be formed in a plurality of sizes and configurations, depending on the requirements of a particular application. The passive treatment area may also include a layer of sound absorptive material to assist the roughness elements with noise attenuation.

A protective cover may be positioned over the passive treatment area for permitting the exhaust flow past therethrough, but still providing adequate structure to support the weight of the aircraft and other objects on the platform. The protective cover may be formed from a wire mesh face plate, or alternatively, from a solid plate with apertures formed therein.

A method of reducing acoustic fatigue of an aerospace vehicle includes attenuating sound waves and unsteady pressure fluctuations generated by high velocity mass flow exiting from an exhaust nozzle of the engine of the vehicle. The attenuated sound waves and pressure waves may be reflected omnidirectionally from the source of the attenuation. The reflected sound and pressure waves impinge on the vehicle with less magnitude than non-attenuated exhaust flow.

The method of attenuation of the exhaust flow includes destroying large scale coherent flow and breaking large scale vortices into incoherent flow. The flow disruption may be accomplished by positioning at least one set of roughness elements on the support platform at the impinging location of the flow of the exhaust to interfere with the organized flow. Impinging the exhaust on a layer of acoustical absorptive material may further attenuate the magnitude of the noise reflected from the platform.

In an illustrative embodiment of the invention, this disclosure presents a technique to treat the carrier deck to reduce STOVL aircraft noise and unsteady pressures. The disclosure provides for surface treatments in local areas on carrier decks to reduce noise levels and pressure fluctuations for STOVL aircraft landing and takeoff operations. The treatment targets the most damaging components of the noise which includes tones due to impingement of the jet exhaust flow on the carrier deck, but may also reduce other components such as broadband noise from jet mixing and from the excitation of the flows by the tones. Small-scale tests have shown that this technique can reduce tone noise by as much as 20 dB. The test results also show that broadband noise reduction is efficient at all frequencies. The levels of reduction range from about 3 dB at high frequencies to as much as 10 dB at low frequencies.

While the invention has been described in connection with what is presently considered to be the most practical and preferred embodiment, it is to be understood that the invention is not to be limited to the disclosed embodiments, but on the contrary, is intended to cover various modifications and equivalent arrangements included within the spirit and scope of the appended claims, which scope is to be accorded the broadest interpretation so as to encompass all such modifications and equivalent structures as permitted under the law.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
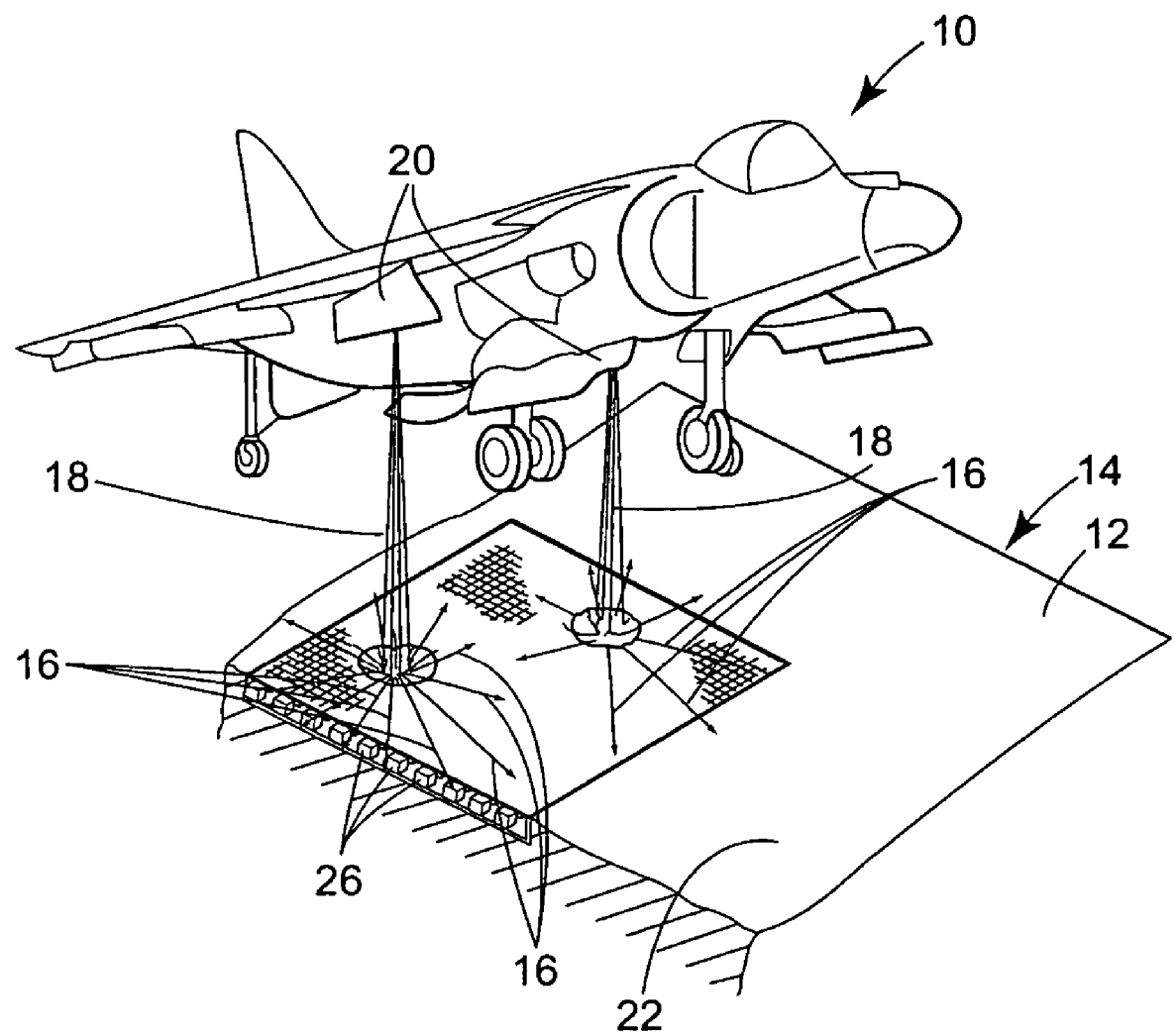
FIG. 1 depicts a STOVL aircraft landing/taking off from a platform having a passive treatment area for noise reduction.

Referring now to FIG. 1, a Short Take Off and Vertical Landing (STOVL) aircraft 10 is depicted landing/taking off from a landing platform 12 having a passive treatment area 14. The passive treatment area 14 is operable for reducing the magnitude of the sound waves and pressure fluctuations 16 generated by high velocity exhaust mass flow 18 exiting from an aircraft engine nozzle 20, impinging on a surface 22 of the platform 12 and reflecting therefrom.

Figure 2:
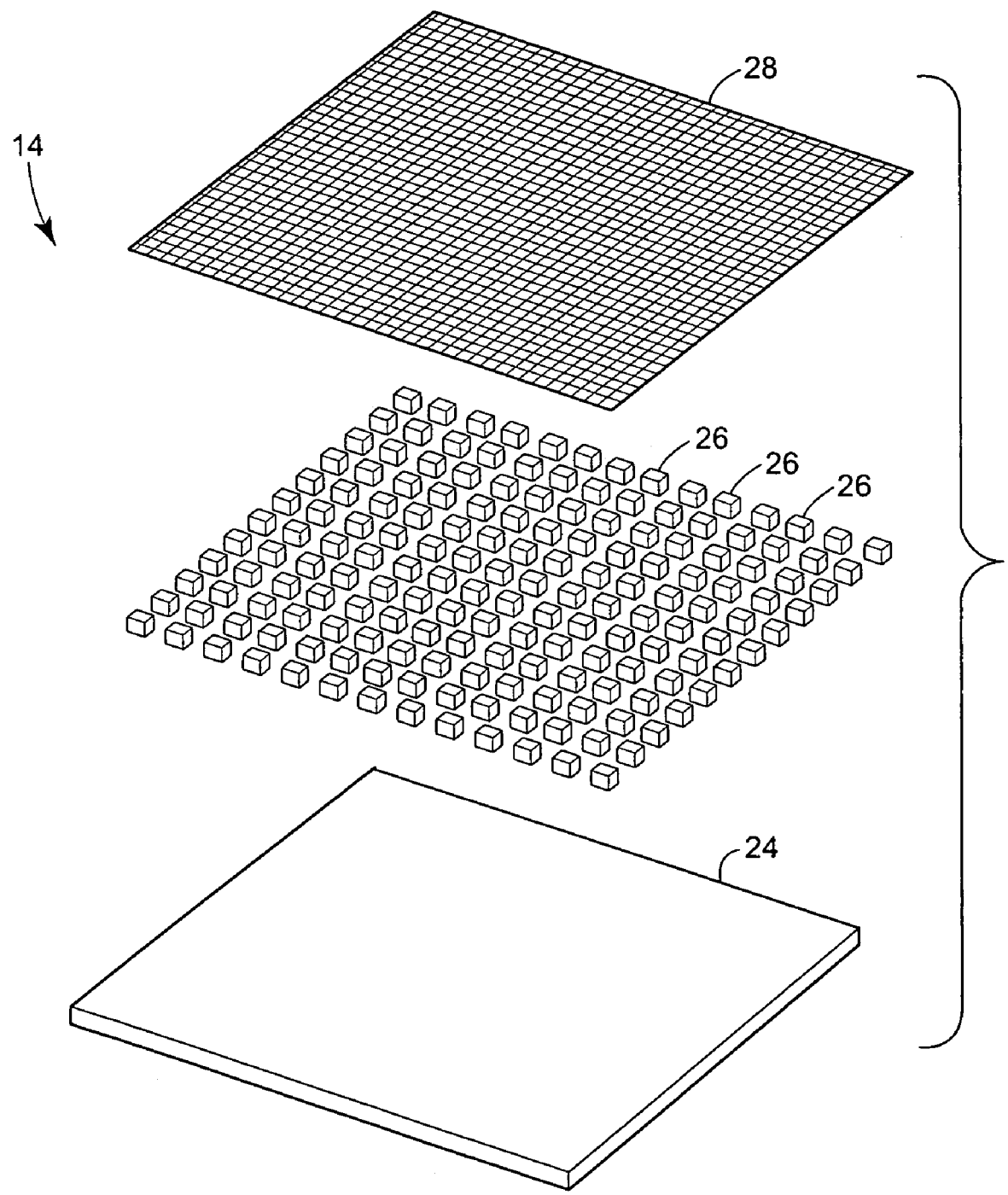
FIG. 2 is an exploded view of the passive treatment area of FIG. 1.

Referring now to FIG. 2, an exploded view of the passive treatment area 14 as shown therein. The passive treatment area 14 includes a layer of acoustic or sound absorbing material 24 to provide noise attenuation. The passive treatment area 14 also includes one or more roughness elements 26 for disrupting the high velocity flow structures of the exhaust flow 18 and attenuating the reflected sound waves and unsteady pressure fluctuations 16. The roughness elements 26 are depicted as homogeneous, evenly spaced elements formed in a single layer. However, the present invention also contemplates various arrays of elements 26 positioned in multiple layers as well. A cover 28 may be positioned over the passive treatment area 14. The cover 28 may be formed from a material that permits the exhaust flow 18 to pass therethrough while simultaneously providing adequate structural support for the weight of the aircraft, storing equipment, or walking thereon by support personnel. The cover 28 may be formed from a wire mesh face plate or other alternatives, such as a solid sheet with apertures formed therein.

Figure 3:
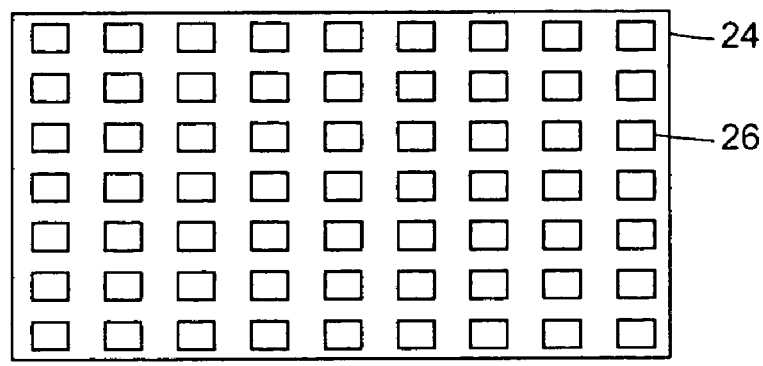
FIG. 3 is a top view of roughness elements embedded in an layer of sound absorbing material.

The acoustic absorbing layer 24 may be formed from a honeycomb-type structure, a composite structure, or of other types known to those skilled in the art, that will withstand the temperatures and pressures associated with high velocity and high temperature exhaust mass flow from aerospace engines, such as, for example, gas turbine engines or rocket engines. The roughness elements 26 can be embedded or fixed in a desired pattern with respect to the sound or acoustic absorbing layer 24 as shown in FIG. 3.

Figure 4:
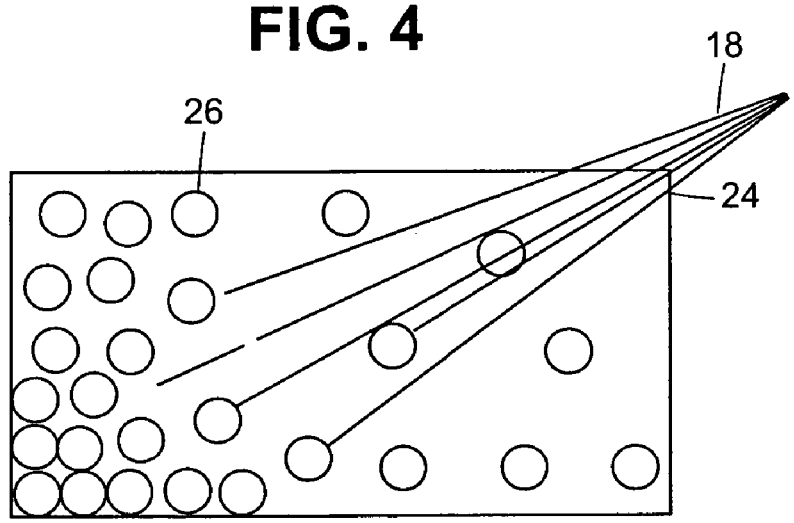
FIG. 4 is a top view of roughness elements that are disassociated and moveable with respect to the sound absorbing layer.

Alternatively, the roughness elements 26 may be moveable with respect to the acoustical sound absorbing layer 24, as shown in FIG. 4. In the illustrative embodiment of FIG. 4, the roughness elements 26 may tend to move in a random motion when the exhaust flow 18 is impinging thereon.

Figure 5:
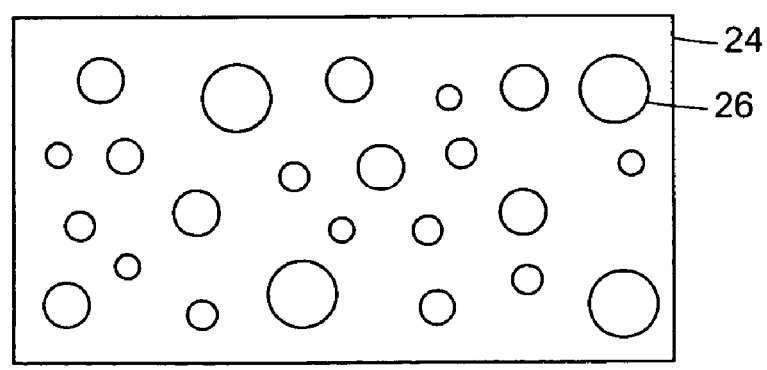
FIG. 5 is a top view of the passive treatment area depicting roughness elements of different sizes.
Figure 6:
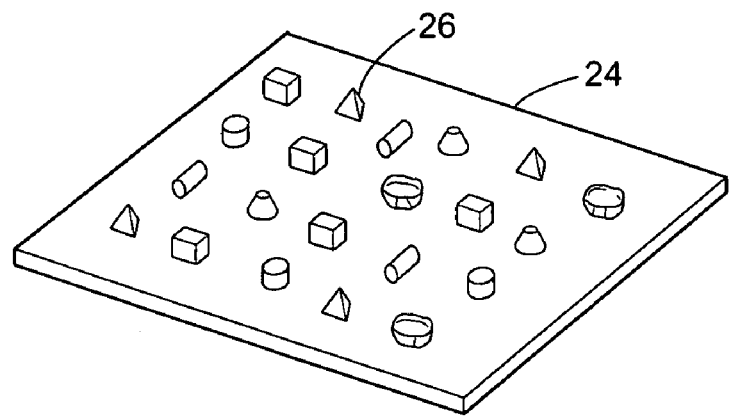
FIG. 6 is a top view of the passive treatment area depicting roughness elements having different shapes.

The roughness elements 26 also may be formed of varying sizes, as shown in FIG. 5 and/or varying shapes, as shown in FIG. 6. Suitable shapes include, but are not limited to, tetrahedrals, cubes, spheres, cylinders, as well as random geometric three-dimensional shapes. Various applications may lend themselves to a particular roughness element shape or pattern. The roughness elements 26 may be formed from a variety of materials capable of withstanding a high temperature and high pressure environment. Material selection may include metals, composites, and ceramics.

In one embodiment, the passive treatment area 14 is conceived to be installed on a deck of a aircraft carrier. The passive treatment area 14 may be installed on top of current carrier decks, or alternatively, may be used to replace partial sections of the deck. In alternate embodiments, the passive treatment area 14 may be used in conjunction with land-based takeoff and landing runways, or stationary launching pads such as those used by the space shuttle. In addition, the passive treatment area 14 may be used in test cells or other experimental laboratories to reduce noise and vibration-inducing pressure fluctuations.

In operation, aircraft acoustic fatigue and noise may be reduced by attenuating the sound waves and unsteady pressure fluctuations 16 generated by high velocity mass flow 18 exiting from the exhaust nozzle 20 of an aerospace engine such as a gas turbine or rocket engine. The attenuated sound and pressure waves 16 are reflected omnidirectionally from the source of attenuation and impinge to a lesser degree than untreated waves on the vehicle or individuals near the vehicle. The attenuation occurs by destroying large scale vertical flow structures and breaking large scale vortices into incoherent flow with the roughness elements 26 and a sound absorbing layer 24 in the passive treatment area 14.

Figure 7A:
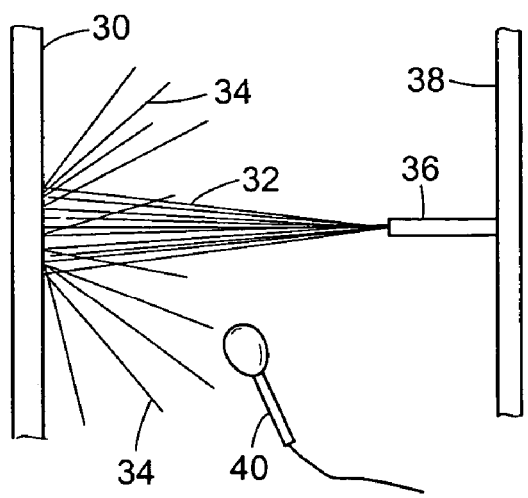
FIG. 7A is a depiction of a small scale baseline test set-up.
Figure 7B:
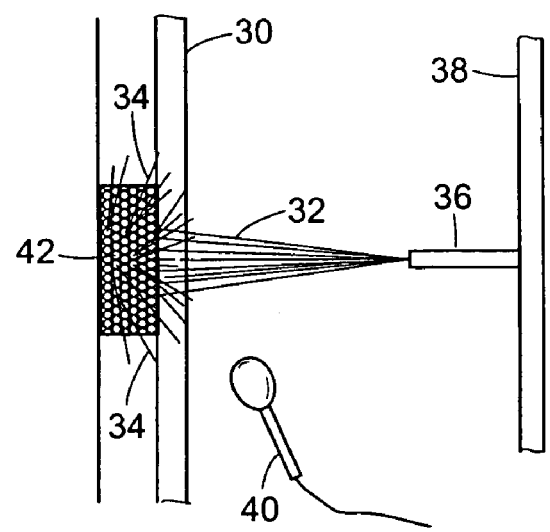
FIG. 7B depicts a small scale test of FIG. 7A with the addition of passive treatment.

A small scale experiment was conducted to determine the feasibility and prove the concept as a viable solution to the problem at hand. FIGS. 7A and 7B illustrate the setup used in the testing. The baseline test illustrated in FIG. 7A, utilizes a surface 30 without passive treatment for noise abatement. The impinging jet flow 32 and the reflected energy waves 34 emanated from a single jet nozzle 36 attached to a support structure 38. A microphone 40 was positioned at a specified distance from the impinging jet flow 32 to take baseline noise measurement readings. The baseline test showed typical data for the impinging jet flow 32, namely an intense tone superimposed with a broadband of background frequencies.

The test set-up as illustrated in FIG. 7B was similar to the baseline test of FIG. 7A. However, a passive treatment area 42, positioned in the path of the impinging jet flow 32, was included.

To test the robustness of the treatment concepts of various types of treatment elements were tested. Significant noise reduction was observed for all treatments. One typical result including a test wherein the jet Mach number was 1.3 and treatment area was approximately ten times that of the nozzle diameter 36. The nozzle was positioned approximately four diameters away from the surface of the passive treatment area 42. The impingement tones were completely suppressed by the treatments leading to more than a 20 decibel noise reduction as measured by the testing apparatus in the figures. The broadband noise was also reduced by as much as eight decibels.

Figure 8A:
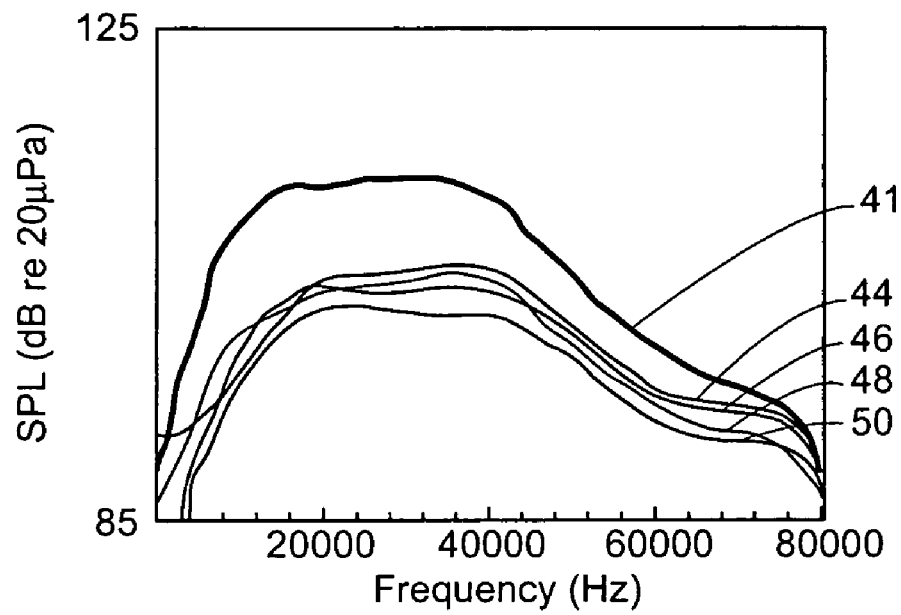
FIG. 8A graphically depicts a representation of actual test data from testing of various roughness element materials.

To further demonstrate the technical feasibility of this concept in practical applications, various flow conditions, roughness element materials, and nozzle configurations were tested. FIG. 8A shows a representation of actual test data results where various roughness element materials were analyzed. The figure plots decibel versus frequency as a function of material. The data clearly shows that all of the materials selected, including perforated plate/foam carpeted brass 44, foam/carpeted 46, brass mesh 48, steel roll 50, produced significant noise reduction over the baseline 41 defined by the untreated surface 30.

Figure 8B:
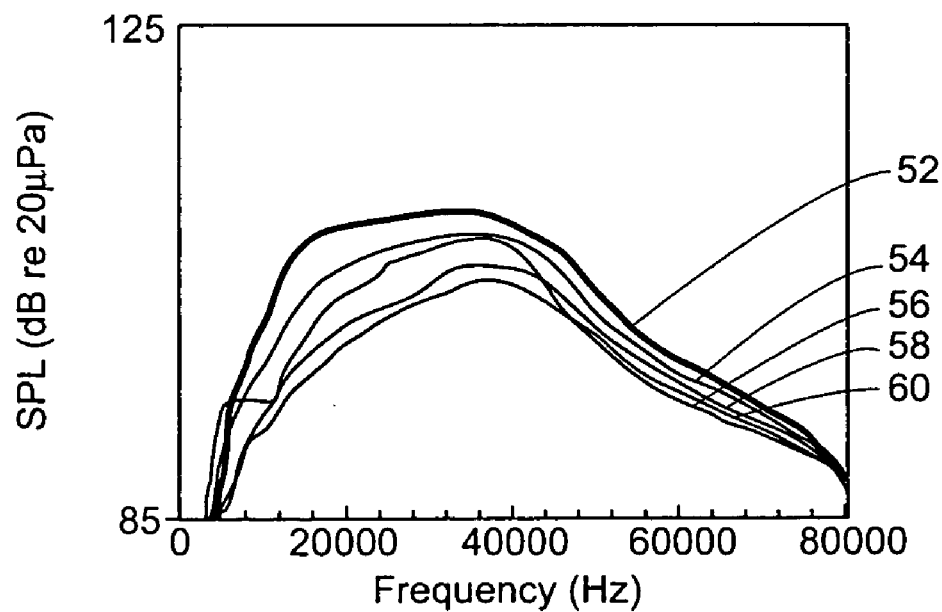
FIG. 8B graphically depicts a representation of actual test data from testing of having passive treatment areas of various sizes.

Likewise, FIG. 8B shows test date for various treatment areas relative to the diameter of the jet nozzle 36. The jet Mach number for this figure was 1.3, the jet nozzle 36 was 3 diameters away from the surface 30 and the treatment was a perforated plate over foam. The figure plots decibel versus frequency as a function of the passive treatment area diameter divided by the nozzle diameter (D/d). The figure shows baseline data defined by line 52 compared with various passive treatment areas having diameter ratios of 2.5, 5, 10, and 20 defined by lines 54, 56, 58, and 60 respectively. The data shows noise reduction is more effective with increasing treatment size, but the effectiveness saturates when the diameter of the treatment area approaches 10 nozzle diameters. For applications such as an aircraft carrier deck, a treatment area corresponding to 10 nozzle diameters may be a small patch on the deck, which makes this treatment concept practical and feasible. The success with various types of treatments and configurations indicates that the concept disclosed quite probably has applications in other areas where noise and unsteady pressures from impinging jets are of concern, such as, for example, liftoff of launch vehicles.

Although the preferred embodiments of the invention have been disclosed for illustrative purposes, those skilled in the art will appreciate that various modifications, additions, and substitutes are possible, without departing from the scope and spirit of the invention as disclosed herein and in the accompanying claims.

What is claimed:

1. A platform for an aerospace vehicle for reducing unsteady pressure fluctuations of high velocity exhaust mass flow exiting from an aerospace vehicle to reduce fatigue, the platform comprising:
   a passive treatment area positioned adjacent said platform, passive treatment area operable for reducing the unsteady pressure fluctuations generated by the high velocity exhaust mass flow exiting from an exhaust nozzle of said aerospace vehicle and impinging on a surface of said platform and reflecting therefrom in order to reduce the fatigue of the platform, said passive treatment area comprising at least one roughness element for disrupting high velocity structures of said exhaust flow to attenuate said unsteady pressure fluctuations, said passive treatment area further operable to attenuate reflective sound waves, wherein said at least one roughness element comprises at least one of a plurality of elements of varying sizes, elements of irregular shapes, and elements of both varying sizes and irregular shapes.

2. The platform of claim 1, wherein said passive treatment area comprises:
   a layer of sound absorptive material to provide noise attenuation.

3. The platform of claim 1, wherein the high velocity exhaust mass flow has a jet Mach number within range of 1.3 jet Mach.

4. The platform of claim 1, wherein a layer of sound absorbing material is positioned under said at least one roughness element.

5. The platform of claim 1 further comprising:
   a cover positioned over said passive treatment area.

6. The platform of claim 5, wherein said cover permits said exhaust flow to pass therethrough and provides adequate structure to support the weight of said aerospace vehicle.

7. The platform of claim 6, wherein said protective cover is formed from a wire mesh faceplate.

8. The platform of claim 2, wherein said sound absorptive material is formed from a honeycomb structure.

9. The platform of claim 2, wherein said sound absorptive material is formed from a composite structure.

10. The platform of claim 1, wherein at least one of the elements is a sphere.

11. The platform of claim 1, wherein at least one of the elements is a cylinder.

12. The platform of claim 1, wherein at least one of the elements is a cube.

13. The platform of claim 1, wherein at least one of the elements is a tetrahedron.

14. The platform of claim 1, wherein said at least one roughness element is formed from one of a plurality of materials.

15. The platform of claim 14, wherein said material is metal.

16. The platform of claim 14, wherein said material is composite.

17. The platform of claim 14, wherein said material is ceramic.

18. A passive treatment area for reducing unsteady pressure fluctuations of high velocity exhaust mass flow exiting from an aerospace vehicle to reduce fatigue, the passive treatment area comprising:
    means for attenuating the unsteady pressure fluctuations caused by the high velocity exhaust mass flow existing from an exhaust nozzle of the aerospace vehicle to reduce fatigue, the means also attenuating reflected noise, said means comprising:
    a layer of sound absorptive material to provide noise attenuation;
    a plurality of roughness elements positioned adjacent said sound absorptive layer, wherein said roughness elements comprise at least one of elements of varying sizes, elements of irregular shapes, and elements of both varying sizes and irregular shapes; and
    a covering positioned over said passive treatment area operable for permitting sound waves to pass through to said roughness elements and sound absorption material.

19. The passive treatment are of claim 18, wherein the means is for attenuating the unsteady pressure fluctuations caused by the high velocity exhaust mass flow having a jet Mach number within range of 1.3 jet Mach.

20. The passive treatment area of claim 18, wherein said protective covering provides a structural support surface for walking, aircraft landing and take off, and storing equipment thereon.

21. The passive treatment area of claim 18, wherein said roughness elements are operable for disrupting the high velocity exhaust mass flow and dispersing said unsteady pressure fluctuations and said attenuated sound waves.

22. The passive treatment area of claim 18, wherein said cover is formed from a wire mesh faceplate.

23. The passive treatment area of claim 18, wherein said sound absorptive material is formed from a honeycomb structure.

24. The passive treatment area of claim 18, wherein said sound absorptive material is formed from a composite structure.

25. The passive treatment area of claim 18, wherein at least one of the elements is a sphere.

26. The passive treatment area of claim 18, wherein at least one of the elements is a cylinder.

27. The passive treatment area of claim 18, wherein at least one of the elements is a cube.

28. The passive treatment area of claim 18, wherein at least one of the elements is a tetrahedron.

29. The passive treatment area of claim 18, wherein said roughness elements are formed from one of a plurality of materials.

30. The passive treatment area of claim 29, wherein said material is metal.

31. The passive treatment area of claim 29, wherein said material is composite.

32. The passive treatment area of claim 29, wherein said material is ceramic.

33. The passive treatment area of claim 18, wherein said roughness elements are fixed with respect to said sound absorbing layer.

34. The passive treatment area of claim 18, wherein said roughness elements are movable with respect to said sound absorbing layer.

35. The passive treatment area of claim 18, wherein said treatment area is operably associated with a support platform for short takeoff and vertical landing vehicles (STOVL).

36. The passive treatment area of claim 18, wherein said treatment area is operably associated with a rocket launch facility.

37. The passive treatment area of claim 18, wherein said treatment area is operably associated with a support platform for research and test facilities having engine test stands.

38. A method of reducing acoustic fatigue of an aerospace vehicle having high velocity exhaust mass flow exiting from the aerospace vehicle, the method comprising:
    positioning a passive treatment area in a path of the high velocity exhaust flow exiting from the aerospace vehicle, wherein said passive treatment area comprises at least one roughness element comprising at least one of a plurality of elements of varying sizes, elements of irregular shapes, and elements of both varying sizes and irregular shapes;
    attenuating unsteady pressure fluctuations generated by said high velocity exhaust flow, and further attenuating sound waves;
    reflecting said attenuated pressure and sound waves omni-directionally from said passive treatment area; and
    impinging said attenuated pressure fluctuations on said aerospace vehicle.

39. The method of claim 38, wherein the attenuating step comprises:
    destroying large scale vertical flow structures; and
    breaking large scale vortices into incoherent flow.

40. The method of claim 39, wherein the destroying and breaking steps comprise:
    positioning the at least one roughness element in said flow path of said high velocity exhaust flow for interfering with said flow structure.

41. The method of claim 38, wherein the attenuating step further comprises:
    absorbing unsteady pressure fluctuations and sound waves from said high velocity exhaust flow.

42. The method of claim 41, wherein the absorbing step further comprises:
    positioning a layer of acoustical absorptive material in said flow path of said high velocity exhaust flow.

43. A method of attenuating and reflecting unsteady pressure fluctuations and sound waves of an aerospace vehicle having high velocity exhaust mass flow existing from the aerospace vehicle using a passive treatment area located on an aircraft support platform, the method comprising:
    forming a passive treatment area adjacent said platform, in which said forming further comprises:
    positioning a layer of sound absorption material in said passive treatment area;
    embedding at least one roughness element in said sound absorbing layer, wherein said at least one roughness element comprises at least one of a plurality of elements of varying sizes, elements of irregular shapes, and elements of both varying sizes and irregular shapes; and
    directing high velocity exhaust flow from an engine of the aerospace vehicle toward said passive treatment area.

44. The method of claim 43, wherein the forming step further comprises:
    covering said treatment area with a cover formed of material operable for permitting high velocity exhaust flow to pass therethrough and of sufficient strength to support the weight of an aircraft.

45. The method of claim 43 wherein the high velocity exhaust mass flow has a jet Mach number within range of 1.3 jet Mach.

46. The method of claim 38 wherein the high velocity exhaust mass flow has a jet Mach number within range of 1.3 jet Mach.

* * * * *